Nov. 3, 1936.                    R. BERK                    2,059,928
                              DENTAL FLASK
                           Filed July 17, 1935
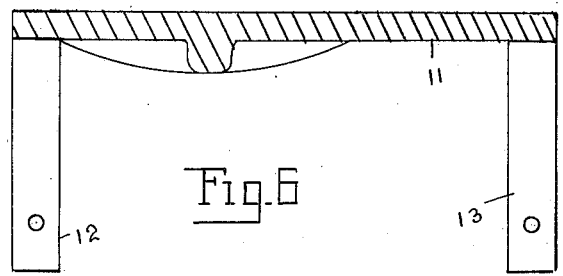
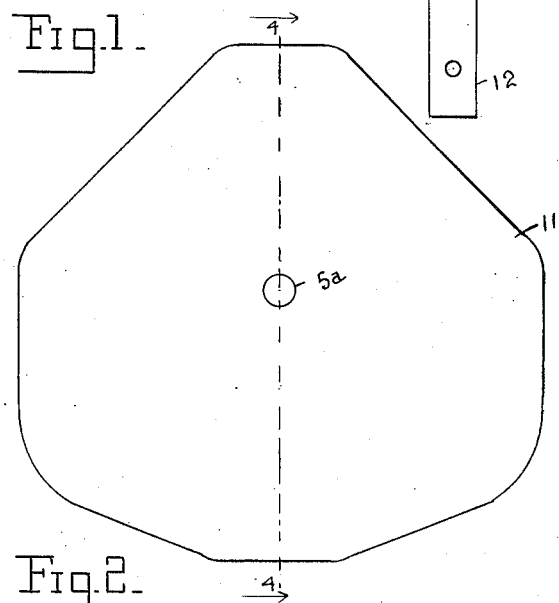
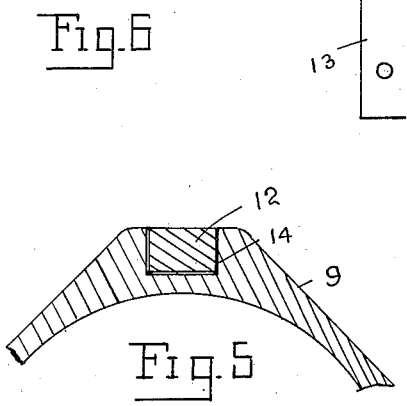
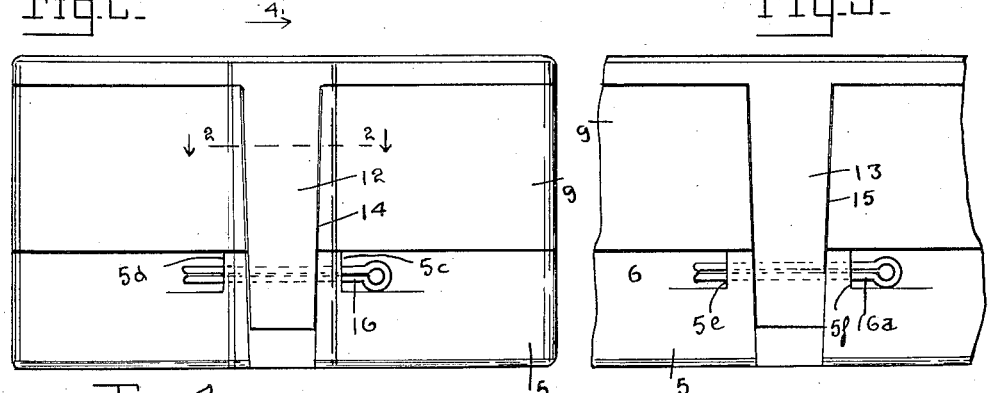
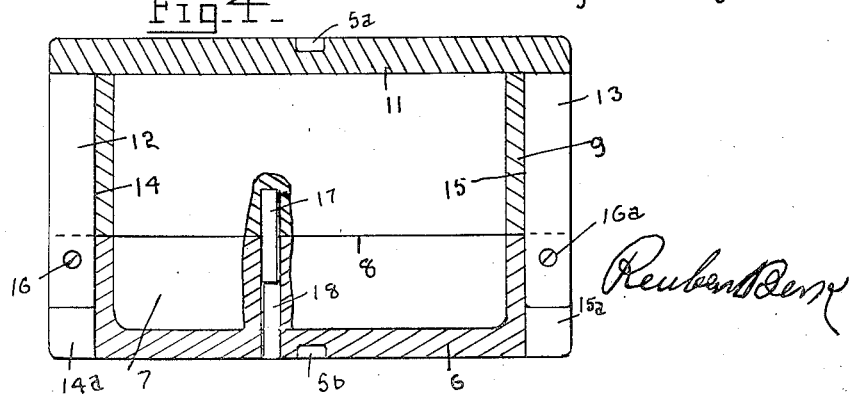
INVENTOR.
Reuben Berk Patented Nov. 3, 1936

2,059,928

UNITED STATES PATENT OFFICE 2,059,928

DENTAL FLASK

Reuben Berk, Bronx, N. Y.

Application July 17, 1935, Serial No. 31,813

2 Claims. (Cl. 18—33)

This invention relates to an improved dental flask, and one of its objects is to provide a flask which can be placed in a vulcanizer, so that the total capacity of the vulcanizer in holding dental flasks may be increased, and the invention is embodied in a construction which includes coupling means by means of which the sections of the dental flask may be coupled to enclose the plaster mold and dental work, without the aid of a clamp.

Another object of the invention is the provision of a dental flask of this nature, having a relative smooth and continuous external surface, which will permit the economical grinding and polishing of the cast sections.

A further object of the invention is the provision of a dental flask consisting of a plurality of sections, certain of the sections having external grooves and one of the other sections having integral bolts insertable in the grooves, so that the sections may be coupled together by pins driven through the grooved sections, the parts being so designed that congestion of the holes which receive the pins by the filling of plaster can be easily cleared.

With the above and other objects of the invention in view, the invention comprises certain new and useful constructions, combinations and arrangements of parts, clearly described in the following specification; and fully illustrated in the drawing, in which:—

Fig. 1 is a top plan view of the improved dental flask.

Fig. 2 is a side view thereof.

Fig. 3 is a fragmentary side view, looking from the opposite side to that shown in Fig. 2.

Fig. 4 is a transverse sectional view, taken on line 4—4 of Fig. 1, looking in the direction of the arrows.

Fig. 5 is a detail horizontal sectional view, taken on line 2—2 of Fig. 2, looking in the direction of the arrows.

Fig. 6 is a side elevation, partly in vertical section of the cover section.

Referring to the drawing illustrating the practical construction of the invention 5 designates a base or bottom flask section, which is provided with a bottom wall 6 and an integral upstanding side wall 7. The upper edge of this side wall at 8 is shown to be at approximately right angles to the plane of the bottom wall.

On the upper wall edge 8 the intermediate flask section 9 is disposed, the inner wall surface 10 of which is disposed in the same plane as the inner wall surface of the wall 7. The upper edge of this intermediate flask section is shown to be disposed in substantially parallel relation to the edge 8, and is engaged by the cover flask section 11, so that it will have a snug fit therewith.

The cover flask section 11 is formed with integral lugs 12 and 13, located on opposite sides thereof, and shown to be approximately equal in length. These integral lugs are slightly tapered and are adapted to snugly engage the similar grooves 13 and 14 formed in the ends of the intermediate flask section 9, and also engage the grooves 13a and 14a formed in the base flask section 5. The latter grooves extend clear through to the bottom surface of the base flask section, so that it is easy to force out any plaster or other mold material which may fill the grooves.

The lug 12 is secured in place by means of a cotter or other coupling pin 16, driven through suitable openings 5c and 5d formed in the base section 5. The wall of the base section is also formed with clearances adjacent to said openings to allow the head and ends of the cotter pin to project outwardly of the openings. The base section 5 is also formed with angular surfaces which diverge on opposite sides of the lug 12, so that the pin 16 may be inserted and removed without difficulty.

The locking lug 13 is similarly held or coupled in place by means of the cotter pin 16a, driven through openings 5e and 5f on opposite sides of the lug 13, with the head and the ends of the cotter pin projecting from said openings.

The intermediate section is centered on the base section by means of the pins 17, one being located on each side of the section, and adapted to be inserted in openings 18 formed in the side wall 7 of the base section, as shown in Fig. 4.

The locking lugs have their external surfaces disposed flush with the external surfaces of the base, intermediate and cover flask sections, so that there are no projections extending beyond the external surface of the flask, when the three sections are coupled together. The ends of the cotter pins are even pocketed in the clearances on opposite sides of the connecting lugs, so that the cotter pins will lie wholly within the plane defined by the external surfaces of the complete flask.

The cover flask section may be formed with a centering hole or element 5a and the base flask section may be formed with a similar centering flask section 5b, whereby the assembled flask may be gripped between two holders and turned against a grinding wheel or polishing wheel, so that economical grinding and polishing may be completed, with a minimum expenditure of time and labor, and to produce the best possible results.

The bottom and top surfaces of the flask are parallel to each other and due to the absence of any external projections the flask may be arranged in a standard dental vulcanizer, so that one or more flasks of the same size may be included in the same vulcanizer. This compact arrangement is also made possible by the use of the coupling means employed, which permits of the dispensing with the use of a clamp to hold the dental flask parts in the vulcanizer. A clamping means may be employed to hold the dental flask parts close together to permit of the easy insertion of the coupling pins, but when the pins are coupled in position the use of the clamp is no longer required.

The opposite ends of the flask are differently shaped, so that it is impossible to match one section with the other except in one position.

I claim as new and patentable:—

1. A dental flask comprising a base section having a bottom wall formed with an external plane face and provided with a vertical wall formed with tapered grooves in the opposite sides thereof, said base section being further provided with vertical holes in the opposite sides of said vertical wall, an intermediate section corresponding in external shape to said base section and disposed thereon, said intermediate section being formed with external grooves registering with the grooves of the base section and of corresponding form, a cover section mounted on the intermediate section and provided with depending tapering locking lugs adapted to be snugly received by the registering grooves, the base section being formed with clearances to receive the ends of cotter pins, said clearances being located adjacent the grooves thereof and said locking lugs being formed to receive said cotter pins, cotter pins extending through said base section and said locking lugs to hold the sections in coupled relation to each other, the intermediate section having pins insertable in the vertical holes of said base sections and said vertical holes being so arranged that on the withdrawal of the pins, waste matter can be driven through the openings to clear the same for further free insertion of said pins.

2. The construction set forth in claim 1 including centering recesses in the base section and in the cover section located in axial relation to the flask, whereby the flask may be turned between centers and ground and polished, the external faces of all of the locking lugs being flushed with the external faces of the flask when the sections are coupled and the cotter pins being nested in the clearances to permit of easy removal and to be located below the external surface of such base section so as to not obstruct the external grinding and polishing of the flask.

REUBEN BERK.